United States Patent

Fasen

[19]

[11] Patent Number: 5,880,456
[45] Date of Patent: *Mar. 9, 1999

[54] CIRCUIT PROVIDES A NORMALIZED POSITION SIGNAL FOR LATERAL PHOTOEFFECT POSITION SENSOR

[75] Inventor: Donald J. Fasen, Boise, Id.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 853,242

[22] Filed: May 9, 1997

[51] Int. Cl.$^6$ ..................................................... G01J 1/32
[52] U.S. Cl. ........................ 250/205; 250/559.3; 369/116
[58] Field of Search ..................................... 250/205, 204, 250/206, 559.3, 548, 214 A, 214 R; 369/116, 44.41, 44.32, 121, 97

[56] References Cited

U.S. PATENT DOCUMENTS 3,778,791  12/1973  Lewicki et al. ........................ 250/205

FOREIGN PATENT DOCUMENTS

690442A2  1/1996  European Pat. Off. .

*Primary Examiner*—Que T. Le

[57] ABSTRACT

A circuit provides a normalized position signal in response to a position of an illuminated spot on a lateral effect photosensor. The photosensor provides a concurrent pair of analog signals. The spot is illuminated by a light emitting diode. The circuit includes a summing circuit that provides a sum signal in response to an algebraic sum of the pair of signals, a first difference circuit that provides the position signal in response to the algebraic difference between the pair of signals, and a second difference circuit that provides an error signal in response to the algebraic difference between a reference signal and the sum signal. The error signal is coupled to the light emitting diode for governing an intensity of the spot, thereby normalizing the position signal.

15 Claims, 2 Drawing Sheets

CIRCUIT PROVIDES A NORMALIZED POSITION SIGNAL FOR LATERAL PHOTOEFFECT POSITION SENSOR

FIELD OF THE INVENTION

Embodiments of the present invention relate to positioning systems and to techniques for obtaining head to media alignment in devices for audio, video, and data playback and recording.

BACKGROUND OF THE INVENTION

As an introduction to problems solved by the present invention, consider the conventional digital tape drive having numerous tracks for the storage and retrieval of data. As the tape passes a tape head, a servo code signal, detected by the head, governs alignment of the head in the center of a particular track. The alignment of the tape and head varies as a consequence of mechanical properties and tolerances of the tape transport and of internal and external mechanical shock and vibration. Voice coil motors support conventional tape heads for maintaining alignment of the head and media in response to the servo code signal. Other conventional devices for audio, video, and data playback and recording also use servo code controlled voice coil motors for alignment of a magnetic or optical head to media formed as tape or disk.

A positioning system based merely on servo code detected from the media is insufficient to meet market demand for convenient, quick, and reliable devices for audio, video, and data playback and recording. Convenience requires ever increasing storage capacity per unit of media. Conventional designs provide increased capacity by increasing track density and consequently decreasing track width, thereby making the process of maintaining alignment more difficult and more expensive. A system that maintains alignment by servo code responds slowly and unreliably when the servo code is corrupted or unavailable. Servo code is primarily corrupted by media and head contamination and defects in the media. Furthermore, servo code is unavailable when the media is not moving because without movement, there is no detected signal.

Conventional systems incur delay to obtain alignment. Before a positioning system that uses servo code can maintain alignment, at least coarse alignment must be obtained. When a stepper motor and lead screw are used in a conventional head positioning system, the stepper motor intrinsically provides information related to current position of the head. However, this information lacks continuous resolution. Additional delays are incurred as a consequence of the masses of moving parts. In addition, reliability suffers from wear.

Devices that playback and record audio, video, and data are commonly incorporated into more sophisticated systems having demanding access time and media capacity requirements. Delays degrade the performance of such sophisticated systems and in some cases reduce the usable capacity of the media employed therein.

Conventional positioning techniques limit media capacity. A considerable length of tape passes across the head in a conventional tape drive as the drive attempts to obtain alignment initially, upon tape reversal, around small defects in the media, and between blocks. Similarly, disk media is fragmented by portions used for obtaining alignment. In each case, media otherwise useful for signal storage is consumed for purposes of obtaining or maintaining alignment.

In view of the problems described above and related problems that consequently become apparent to those skilled in the applicable arts, the need remains in positioning systems for techniques for obtaining head to media alignment in devices for audio, video, and data playback and recording.

SUMMARY OF THE INVENTION

Accordingly, a positioning system in a first embodiment of the present invention includes a head, a motor, a lateral effect photosensor, an illuminating means, and a control circuit. The head detects a recorded signal when aligned with provided media. The motor is in mechanical communication with the head for obtaining alignment in response to a motor drive signal. The lateral effect photosensor is in mechanical communication with the motor for monitoring a distance measured between the head and the media. The photosensor provides a position signal according to the distance. The illuminating means is in mechanical communication with the motor. The illuminating means illuminates the photosensor, enabling provision of the position signal. The control circuit provides the motor drive signal in response to the position signal so that the aligned position is obtained.

A positioning assembly in another embodiment, for positioning a provided head in operative alignment with provided media for detecting a signal from the media, includes a motor having a stator and an armature. The stator includes a lateral effect photosensor. The armature provides for mechanical communication with the head and includes means for illuminating the photosensor. The photosensor provides a signal in response to the illumination for determining a position of the armature.

According to a first aspect of these embodiments, a signal for determining position is independent of movement of the media. Alignment of the head and media is obtained without delays associated with sufficient movement of the media in a prescribed direction.

According to another aspect, the signal provides absolute position information having high and continuous resolution. Movement of the head to obtain or maintain alignment is controllable using analog circuit technique as opposed to a more complex digital stepper motor control technique. With improved position information and analog circuit technique, lower cost and higher reliability products are practical.

According to yet another aspect, high resolution positioning in cooperation with other aspects facilitates decreased track width, increased track density, rapid track access, and increased media capacity.

According to still another aspect, the means for illuminating has little mass, facilitating rapid head movement, decreased access time, and rapid initial alignment or realignment after interruption of servo code signals when used in cooperation with positioning systems that use servo code.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

Figure 1:
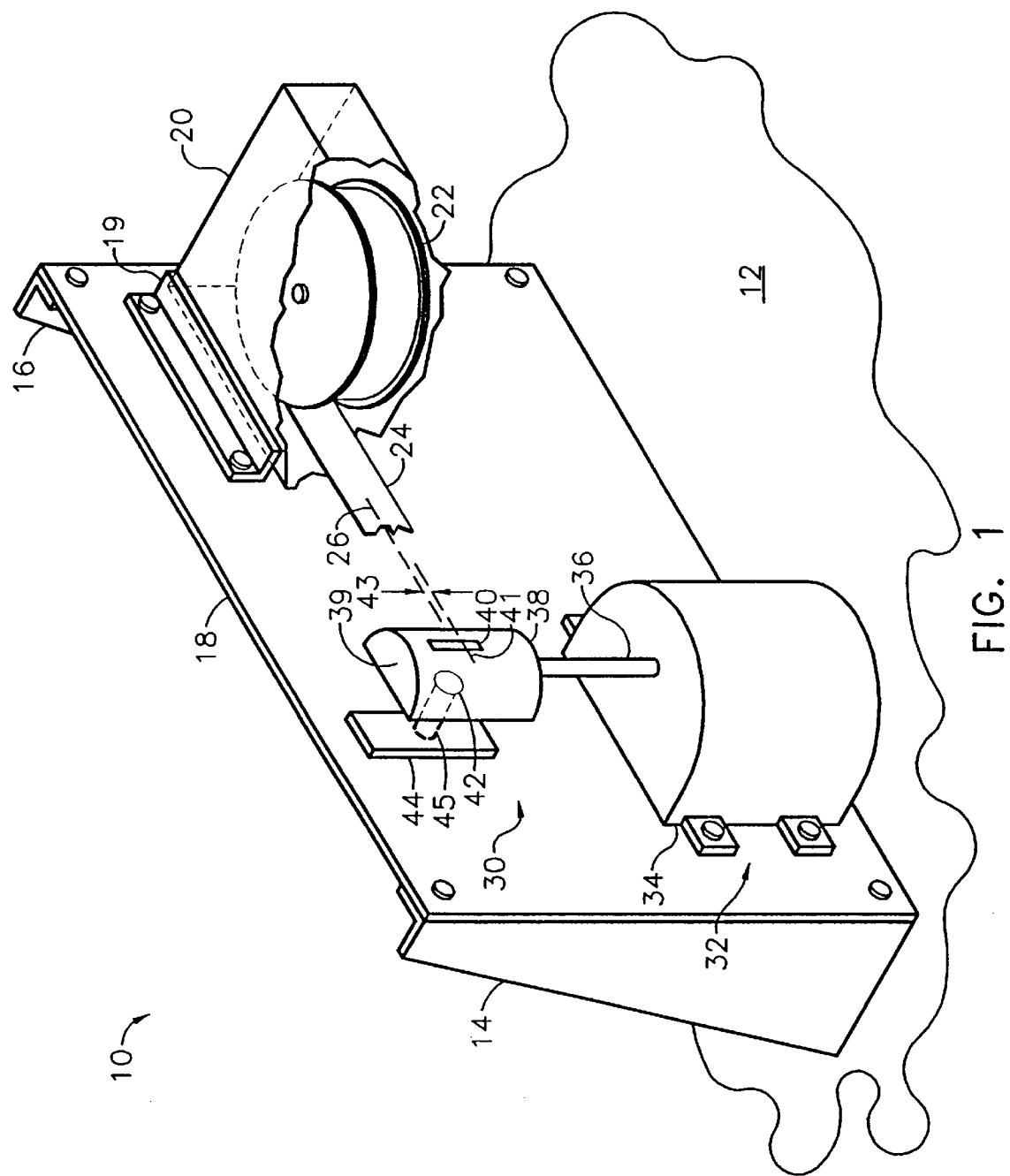
FIG. 1 is a partial perspective view of a tape drive in one embodiment of the present invention.

The partial perspective view of a cartridge tape drive, shown in FIG. 1, illustrates one embodiment of the present invention. Tape drive 10 primarily includes base 12, circuit assembly 18, positioning assembly 30, and removable tape cartridge 20.

Conventional cartridge 20 pivotally supports reel 22 from which a quantity of conventional magnetic recording tape 24 is supplied. Axis 26 describes the center of tape 24 along the width of tape 24. A coarse alignment of cartridge 20 and drive 10 is accomplished by bracket 19. Alternate conventional alignment mechanisms include guide pins, tongue and groove features, and keying surfaces. Tape 24 is moved rapidly along axis 26 across head 38 by a conventional tape transport mechanism, not shown.

The conventional prerecorded magnetic tape has numerous tracks running parallel to axis 26. When track width is narrow, alignment of axis 26 with head 38 is critical to faithful reproduction of the prerecorded signal. Alignment of cartridge 20 against bracket 19 is insufficient by itself for accurate head to media alignment. While it is apparent from FIG. 1 that tape 24 is in mechanical communication with motor 32 by virtue of contact between tape 24, reel 22, cartridge 20, bracket 19, and circuit assembly 18 which supports motor 32, manufacturing tolerances that would facilitate rapid movement of the tape are wider than tolerable for faithful reproduction.

Brackets 14 and 16 support circuit assembly 18 from base 12. Circuit assembly 18 provides mechanical mounting for positioning assembly 30 and electrical circuitry for obtaining and maintaining alignment between head 38 and tape 24 in cooperation with positioning assembly 30. A portion of the electrical circuitry is discussed below with reference to FIG. 2.

Positioning assembly 30 includes motor 32 and lateral effect photosensor 44. In an alternate embodiment, motor 32 and photosensor 44 are mounted on an intermediate substrate or bracket rather than individually onto circuit assembly 18. Such a substrate or bracket simplifies procurement, manufacturing, and testing of the alternate positioning assembly.

In the embodiment shown in FIG. 1, motor 32 is a linear motor which includes stator 34 mounted to circuit assembly 18 and armature 36 on which head 38 is mounted. Head 38 includes light source 42 and transducer 39 of the conventional magnetic type having one or more flux gaps. One gap 40 is shown for simplicity of presentation. Reference line 41 describes a transverse center of gap 40.

When reference line 41 and axis 26 are collinear, an aligned position of tape 24 and head 38 has been obtained. When out of alignment, as shown, a distance 43 measured between reference line 41 and axis 26 describes the extent of deviation from the aligned position. Linear motion of armature 36 operates to reduce distance 43 to obtain and to maintain alignment.

Light source 42 illuminates photosensor 44. Light source 42 in one embodiment is an infrared light emitting diode, preferred for low mass, narrow radiated spectral bandwidth, and electrical compatibility with signals from transducer 39. The substantially direct current signal used to activate such a diode presents little interference to the weak high frequency signals associated with transducer 39.

Light source 42 is one example of an illuminating means for illuminating photosensor 44. In an alternate embodiment, illuminating means includes a light source mounted on circuit assembly 18 and a light deflector mounted on or integral to head 38, transducer 39, or armature 36. In further alternate embodiments, mirrors, lenses, and compound reflective materials are used individually or in combination for the light deflector.

Photosensor 44 is illuminated by light source 42 in a small region or spot 45 corresponding to the current position of armature 36. The remainder of photosensor 44 is substantially unilluminated by radiation of the same spectral bandwidth. As armature 36 is linearly extended and retracted by motor 32, light source 42 is moved linearly across photosensor 44. Spot 45, without interruption of illumination, consequently illuminates other regions of photosensor 44. At any instant of time, therefore, photosensor 44 is illuminated exclusively in a small region such as spot 45, as shown which corresponds to a position of armature 36, head 38, transducer 39, gap 40, and finally reference line 41.

Photosensor 44 is of the conventional lateral effect diode type marketed, for example, by UDT Sensors, Inc. Hawthorne, Calif., United States of America as model SL-15. The UDT Optoelectronic Components Catalog describes such a photosensor in two articles: "Application of Silicon Photodiodes" (pages 3 through 9) and "Position Sensing Series, Position Sensing PIN Photodiodes" (pages 30 through 36), hereby incorporated by reference. The semiconductor structure, packaging, and electrical operation of photosensor 44 are described there. Operation of photosensor 44, positioning assembly 30, and tape drive 10 in the illustrated embodiment is further described with reference to FIG. 2.

Figure 2:
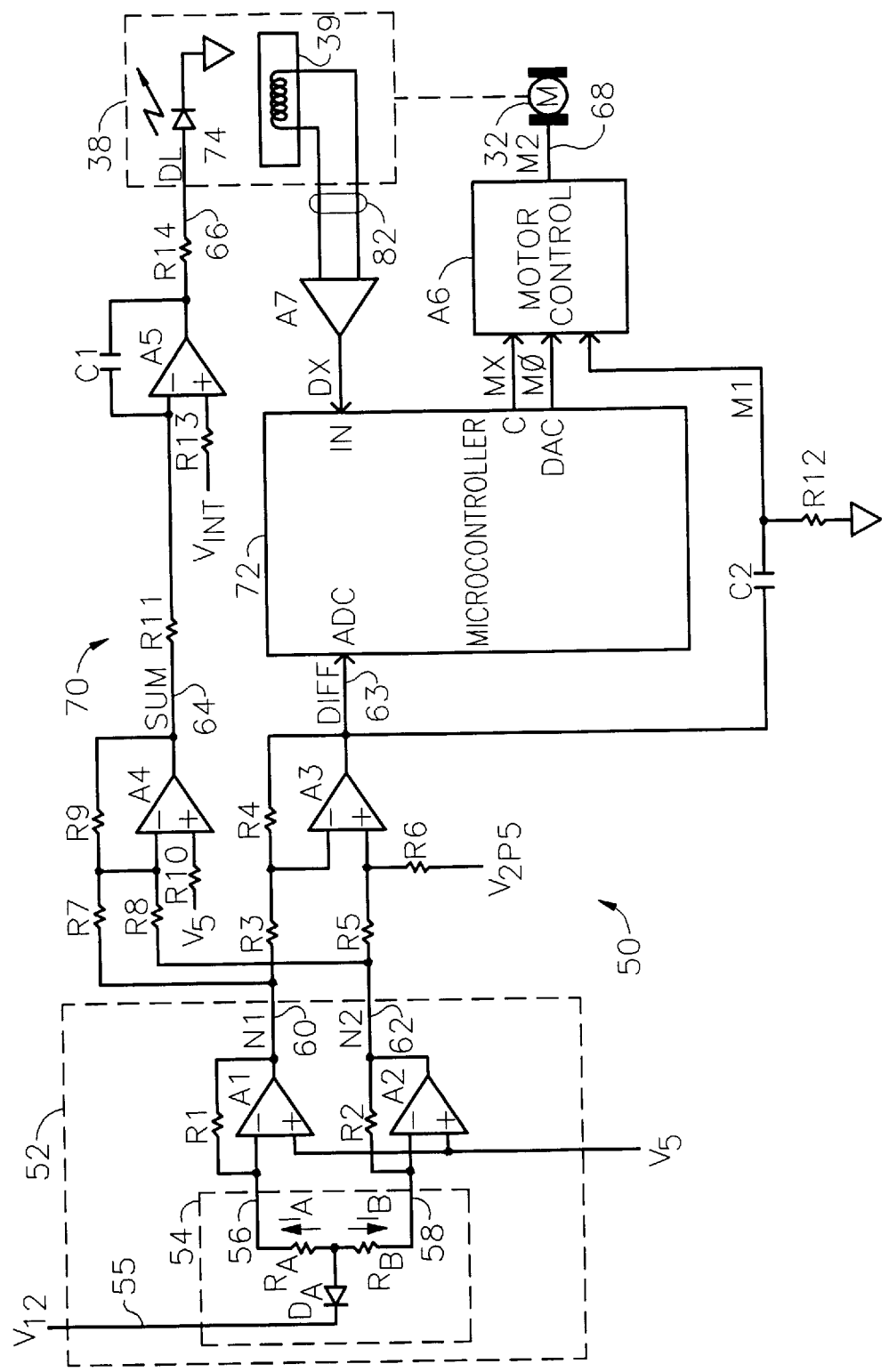
FIG. 2 is a schematic diagram of a portion of the tape drive shown in FIG. 1.

FIG. 2 is a schematic diagram of one embodiment of circuit 50 for obtaining and maintaining the aligned position between head 38 and tape media 24 in tape drive 10 shown in FIG. 1. Components of circuit 50 are of the conventional type indicated by schematic symbol. Conventional manufacturing techniques are employed to implement circuit 50, except as described below. Tape drive 10 includes a positioning system that responds to two resources: photosensor 44 and servo code read from tape 24. Circuit 50 utilizes position information form both resources to obtain and maintain alignment.

Equivalent circuit 54 corresponds to lateral effect photosensor 44 as illuminated at one region such as spot 45. Photosensor 44 provides photocurrents $I_A$ and $I_B$ that cooperate as a position signal. Voltage $V_{12}$ on line 55 provides a back bias on diode $D_A$ of about 12 volts. When illuminated, current attributed to the total illumination divides according to modeled resistances $R_A$ and $R_B$ to form photocurrents $I_A$ and $I_B$. Each current alone conveys some position information, though normalization of the difference of these currents provides more accurate position information. Normalization is accomplished by compensating the difference by the total illumination. In a first embodiment normalization is accomplished with a division circuit, while in another embodiment normalization is accomplished by automatic gain control of the total illumination.

The position signal is presented at the inputs of a difference circuit that provides motor drive signal M2 on line 68. The difference circuit, in one embodiment, includes resistors R1 through R6, amplifiers A1 through A3 motor control A6, microcontroller 72, and firmware stored in microcontroller 72.

Operational amplifiers A1 and A2 cooperate with feedback resistors R1 and R2 to form transconductance buffers, converting input photocurrents $I_A$ and $I^B$ on lines 56 and 58 to voltages N1 and N2 on lines 60 and 62, respectively. In a preferred embodiment, photosensor 44 and buffer circuits including operational amplifiers A1 and A2 are formed on printed circuit board 52. In alternate embodiments board 52 is replaced by a hybrid substrate, a wafer, or a semiconductor substrate for greater fabrication and testing economy.

Signals N1 and N2 are coupled to the inputs of amplifier A3 for computation of analog difference signal DIFF on line 63 that provides absolute position information having continuous resolution. Position information is continuous in value as well as continuous in time, since photocurrents $I_A$ and $I_B$ are concurrent, continuous, analog signals. Resistors R3, R4, R5, and R6, and operational amplifier A3 cooperate to provide signal DIFF having a voltage magnitude responsive to the algebraic difference between the voltage magnitude of signal N1 and the voltage magnitude of signal N2.

Microcontroller 72 is a microcontroller of a conventional type which includes a microprocessor formed with memory, input, and output circuits for equipment control applications. Microcontroller 72 includes an analog to digital converter (ADC) and a digital to analog converter (DAC), each internally coupled with the microprocessor and memory. Microcontroller 72 also includes firmware of a conventional type stored in the memory for performing methods of equipment control. According to such methods, signal DIFF is periodically converted to a digital format having a numeric value conveying absolute position information. When the position information differs from a desired position, the numeric value is used to compute a new drive value for driving linear motor 32 to a new linear position. Drive values are computed with reference to calibration data in tabular and algorithmic format. Drive values are converted by the digital to analog converter portion of microcontroller 72 to provide drive signal M0.

Drive values as discussed above may be inadequate to accomplish sudden movement of head 39 for maintaining proper alignment in spite of sudden mechanical shock. For improved impulse and high frequency response, signal DIFF on line 63 is coupled to motor control A6 in parallel with microprocessor 72. Because signal DIFF corresponds to an absolute position, a first derivative of signal DIFF provides a signal M1 corresponding to velocity. Capacitor C2 cooperates with resistor R12 to differentiate signal DIFF to provide signal M1. In alternate embodiments, one or more derivatives are coupled to motor control A6 for improved head positioning. In the illustrated embodiment, the velocity signal is selectively coupled to motor 32 through motor control circuit A6. The choice of use of signal M0, signal M1, or a combination of signals M0 and M1 is directed by signal MX and provides operational flexibility for improved accuracy in the presence of high frequency vibration and shock.

Motor control circuit A6 performs three functions. First, signals M0 and M1 are combined by a conventional summing technique. Second, the summation result is compensated in the conventional manner to accomodate frequency response characteristics of motor 32. Third, the compensated summation result is amplified in a conventional manner to provide drive signal M2 on line 68 which is applied to motor 32.

As an example of operation of the above described difference circuit, when head 38, shown in FIG. 1, has deviated from a target position as a result of vibration, motor drive signal M2 is provided to move armature 36 and head 38 back to the target position. As another example, when a new target position is selected, such as when head 38 is to be parked or to be moved from a parked position to an operating position, the position signal is sampled, and signal M2, sufficient to obtain the new target position, is driven to motor 32. The mechanical response, for example underdamped, critically damped, or overdamped, is monitored by successive position samples to obtain and maintain the new target position within the time allowed by the system design. Sampling and positioning firmware routines of a conventional type are used to determine each new drive signal value.

Position information is also provided by servo code read from tape 24 as tape 24 is transported across transducer 39. Transducer 39 provides signals on lines 82 which include low power high frequency components of the type conventionally associated with reading magnetic media. Servo code signals on lines 82 are detected and converted to standard logic levels by conventional circuits represented generally as amplifier A7 which provides signal DX. By reading signal DX and assessing its accuracy, microcontroller 72 determines a positioning error value and computes a new drive signal value. The drive signal value is converted by the analog to digital converter of microcontroller 72 to provide signal M0.

In a preferred embodiment the new drive signal value is computed with reference to signal DIFF and signal DX using motor drive techniques discussed above. For example, the servo code signal is considered valid and accurate when no track skip error is indicated from the position signal derived from photosensor 44.

Head 38, shown in FIGS. 1 and 2, includes light source 42, shown as light emitting diode 74, and transducer 39. Diode 74 is driven by signal DL having primarily low frequency and direct current components. Variation in signal DL, therefore, presents little effect on weaker signals conveyed on lines 82. As signal DL varies, the illumination intensity provided by diode 74 varies proportionately. The magnitude of signal DIFF on line 63 is subject to many unit-to-unit variables including, for example, the variation in the total intensity provided by diode 74, the conversion efficiency of diode 74, and the sensitivity of semiconductor materials used to fabricate photosensor 44. To obtain a position signal that is independent of such variations, circuit 50 includes automatic gain control circuit 70.

Intensity signal DL is provided by automatic gain control circuit 70 that primarily includes operational amplifiers A1, A2, A4 and A5. Amplifiers A1 and A2 operate as buffers as discussed above. Amplifier A4 and resistors R7 through R10 cooperate as a conventional summing amplifier circuit providing signal SUM on line 64. The voltage magnitude of signal SUM corresponds to the algebraic sum of the voltage magnitudes of signal N1 and signal N2. The inverting input of amplifier A4 provides a voltage summing node. Although amplifier A5 may appear to be open loop as to DC and frequencies not shunted by feedback capacitor C1, in operation, amplifier A5 maintains signal SUM at the voltage prescribed by reference voltage signal $V_{INT}$ by operation of a feedback path that includes diode 74 and photosensor 44.

Amplifier A5 is a difference amplifier that provides an error signal DL in response to the algebraic difference between signal SUM and reference signal $V_{INT}$. From the point of view of classical control theory, amplifier A5 is a differential integrator that integrates the difference between signals SUM and $V_{INT}$ over time. In either view, amplifier A5 primarily governs the illumination intensity of diode 74 by providing signal DL to diode 74.

Closed loop operation of amplifier A5 may be better understood by a hypothetical example. If signal SUM on line 64 were to have a slightly greater potential than signal $V_{INT}$, the output of amplifier A5 would decrease because signal SUM is coupled to the inverting input of amplifier A5. The decrease in amplifier A5 output would decrease light intensity from diode 74. The sum of photocurrents $(I_A+I_B)$ produced by photosensor 44 modeled by circuit 54 would consequently decrease and signal SUM, formed by the summing circuit having amplifier A4, would decrease back to agree with signal $V_{INT}$. In this fashion, the loop compensates for unit-to-unit variables.

The foregoing description discusses preferred embodiments of the present invention, which may be changed or modified without departing from the scope of the present invention.

For example, in alternate embodiments of circuit 50, diode 74 is driven from a current source such as signal $V_{12}$ as applied through resistor R14 and amplifier A5 and associated components are omitted. In a first alternate embodiment, signal SUM on line 64 is sampled at an analog to digital converter input of microcontroller 72. In such an embodiment, normalization of signal DIFF to compensate for unit-to-unit variables is accomplished by microcontroller 72. The position signal is derived by computation of the converted value of signal DIFF divided by the converted value of signal SUM. In a second alternate embodiment, an analog division circuit provides a quotient output on line 63 for analog to digital conversion by microcontroller 72. Inputs to the analog division circuit include signal SUM on line 64 and signal DIFF as provided by amplifier A3.

Circuit 50 with circuit 70, as shown in FIG. 2, is preferred to the two alternates discussed above because, in addition to intrinsically accomplishing division for normalization, automatic gain control circuit 70 compensates for component aging and contamination. Aging and contamination degrade the light intensity output of diode 74 and degrade the sensitivity and responsiveness of photosensor 44.

As another example, the illustrated embodiment of automatic gain control circuit 70 includes a first stage primarily including amplifier A4 and a second stage primarily including amplifier A5. In an alternate embodiment preferred for having fewer parts, the functions of amplifiers A4 and A5 are combined in one conventional summing circuit having a single operational amplifier with an inverting summing node and a noninverting node for accomplishing the differencing function. To accomplish the necessary number of inversions for proper closed loop response, diode 74 is reversed and its anode is pulled to a positive supply voltage. The output of the single operational amplifier sinks current to illuminate diode 74 rather than sourcing current.

The output of amplifier A5 in yet another embodiment is biased in a conventional manner to drive diode 74 at a minimum extent so that automatic gain control circuit 70 is not stable when diode 74 is not emitting light.

These and other changes and modifications are intended to be included within the scope of the present invention.

While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent by practice of the invention and in light of the disclosure to one of ordinary skill in the art to which the invention applies.

The words and phrases used in the claims are intended to be broadly construed. "Media" includes magnetic tape, flexible and rigid magnetic disk, optical tape or disk, combinations thereof and equivalents.

A "head" refers generally to a sensor or transducer appropriate to sense a signal in cooperation with media, including a magnetic transducer having a flux gap, a compound magnetic structure having several flux gaps, a photosensitive device, combinations thereof and equivalents.

A "motor" includes mechanical apparatus for motion including rotary, linear, reciprocal, and nonlinear motion provided by effects including magnetic, electrostatic, thermal effects, combinations thereof and equivalents. In alternate embodiments, a device in mechanical communication with a motor is coupled to the armature to move when the armature of the motor moves, or is coupled to the stator to remain fixed with the stator.

A "lateral effect" photosensor includes linear, annular, and nonlinear semiconductor shapes exhibiting a difference current phenomenon of the type conventionally associated with linear shapes.

A "signal" refers to mechanical and/or electromagnetic energy conveying information. When elements are coupled, a signal can be conveyed in any manner feasible in light of the nature of the coupling. For example, if several electrical conductors couple two elements, then the relevant signal comprises the energy on one, some, or all conductors at a given time or time period. When a physical property of a signal has a quantitative measure and the property is used by design to control or communicate information, then the signal is said to be characterized by having a "value." The amplitude may be instantaneous or an average.

What is claimed is:

1. A circuit that provides a normalized position signal in response to a position of an illuminated spot on a provided lateral effect photosensor, the photosensor providing a first signal concurrent with a second signal, the spot illuminated by a provided light source, the circuit comprising:
   a. a summing circuit that provides a sum signal in response to an algebraic sum of the first signal and the second signal;
   b. a first difference circuit that provides the position signal in response to a first algebraic difference between the first signal and the second signal; and
   c. a second difference circuit that provides an error signal in response to a second algebraic difference between a reference signal and the sum signal, the error signal coupled to the source for governing an intensity of the spot, thereby normalizing the position signal.

2. The circuit of claim 1 wherein:
   a. a current magnitude of the first signal conveys position information; and
   b. the circuit further comprises a transconductance amplifier that receives the first signal, converts the current magnitude to a voltage magnitude, and provides the voltage magnitude to the summing circuit.

3. The circuit of claim 1 wherein:
   a. the summing circuit comprises a first operational amplifier having a summing node and an output that provides the sum signal, and
   b. the circuit further comprises a first buffer for coupling the first signal to the summing node.

4. The circuit of claim 3 wherein:
   a. the summing node is a voltage summing node;
   b. a current magnitude of the first signal conveys position information; and c. the first buffer provides a voltage magnitude at the summing node in response to the current magnitude.

5. The circuit of claim 3 further comprising a second buffer for coupling the second signal to the summing node.

6. The circuit of claim 5 wherein:
   a. the summing node is a voltage summing node;
   b. a first current magnitude of the first signal conveys position information;
   c. the first buffer provides a first voltage magnitude at the summing node in response to the first current magnitude;
   d. a second current magnitude of the second signal conveys further position information; and
   e. the second buffer provides a second voltage magnitude at the summing node in response to the second current magnitude.

7. The circuit of claim 6 wherein the first difference circuit comprises a second operational amplifier that provides the position signal.

8. The circuit of claim 7 wherein:
   a. the second amplifier comprising an inverting input for responding to the first signal and a noninverting input for responding to the second signal;
   b. the inverting input is coupled to the first buffer and responds to the first voltage magnitude; and
   c. the noninverting input is coupled to the second buffer and responds to the second voltage magnitude.

9. The circuit of claim 1 wherein the first difference circuit comprises an operational amplifier that provides the position signal, the amplifier comprising an inverting input for responding to the first signal and a noninverting input for responding to the second signal.

10. The circuit of claim 9 further comprising a first buffer for coupling the first signal to the inverting input.

11. The circuit of claim 10 wherein:
    a. the inverting input responds to a voltage magnitude;
    b. a current magnitude of the first signal conveys position information; and
    c. the first buffer provides the voltage magnitude at the inverting input.

12. The circuit of claim 10 further comprising a second buffer for coupling the second signal to the noninverting input.

13. The circuit of claim 12 wherein:
    a. the inverting input responds to a first voltage magnitude and the noninverting input responds to a second voltage magnitude;
    b. a first current magnitude of the first signal conveys position information;
    c. the first buffer provides the first voltage magnitude at the inverting input in response to the first current magnitude;
    d. a second current magnitude of the second signal conveys further position information; and
    e. the second buffer provides the second voltage magnitude at the noninverting input in response to the second current magnitude.

14. The circuit of claim 1 wherein the error signal comprises a nonzero voltage magnitude for biasing the source when the first algebraic difference is zero.

15. The circuit of claim 1 wherein the error signal comprises a nonzero current magnitude for biasing the source when the first algebraic difference is zero.

* * * * *